(12) United States Patent
Barnes et al.

(10) Patent No.: US 10,854,019 B1
(45) Date of Patent: Dec. 1, 2020

(54) METHODS AND SYSTEMS FOR REMOTE IDENTIFICATION, MESSAGING, AND TOLLING OF AERIAL VEHICLES

(71) Applicant: Raytheon Company, Waltham, MA (US)

(72) Inventors: Scott G. Barnes, Falls Church, VA (US); Katie J. Maxwell, Fishers, IN (US); Scott D. Harlan, Leesburg, VA (US); Luther John Durkop, III, Cedar Park, TX (US); John S. Lear, Purcellville, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/668,888

(22) Filed: Oct. 30, 2019

(51) Int. Cl.
| | | |
|---|---|---|
| *G08G 1/065* | (2006.01) | |
| *G07B 15/06* | (2011.01) | |
| *G08G 5/00* | (2006.01) | |
| *G06Q 20/32* | (2012.01) | |
| *H04W 4/021* | (2018.01) | |

(Continued)

(52) U.S. Cl.
CPC ........... *G07B 15/063* (2013.01); *F41H 11/02* (2013.01); *G05D 1/0022* (2013.01); *G06Q 20/3224* (2013.01); *G06Q 30/0284* (2013.01); *G07C 5/008* (2013.01); *G08G 5/0069* (2013.01); *G08G 5/0082* (2013.01); *H04K 3/825* (2013.01); *H04W 4/021* (2013.01)

(58) Field of Classification Search
CPC .................................................. G07B 15/063
USPC ..... 340/928, 925, 931; 701/120, 124; 705/5, 705/40
See application file for complete search history.

(56) References Cited

U.S. PATENT DOCUMENTS

| | | | |
|---|---|---|---|
| 10,665,038 B2 | 5/2020 | Crist | |
| 2012/0209636 A1* | 8/2012 | Sloan | G06Q 50/30 705/5 |

(Continued)

FOREIGN PATENT DOCUMENTS

| | | |
|---|---|---|
| EP | 3251108 A1 | 12/2017 |
| WO | WO-2017084031 A1 | 5/2017 |
| WO | WO-2019241298 A1 | 12/2019 |

OTHER PUBLICATIONS

U.S. Appl. No. 16/438,297, filed Jun. 11, 2019, Airspace Tolling.

(Continued)

*Primary Examiner* — Tai T Nguyen
(74) *Attorney, Agent, or Firm* — Schwegman Lundberg & Woessner, P.A.

(57) ABSTRACT

An aircraft tolling system uses tolling tags that are configured for attachment to aerial vehicles. The tolling tags include a data format that can be used by any and all aerial vehicles. The system detects and tracks aerial vehicles in a monitored airspace, and receives data from the aerial vehicles in the monitored airspace. The data include unique identifiers for each of the aerial vehicles in the monitored airspace. The system and device determine operators for the aerial vehicles in the monitored airspace based on a database of aerial vehicle and operator associations, access accounts in the database associated with each of the operators, and apply charges to the accounts associated with each of the operators in response to the reception of the unique identifiers of the aerial vehicles in the monitored airspace.

18 Claims, 7 Drawing Sheets

(51) Int. Cl.
*G07C 5/00* (2006.01)
*G05D 1/00* (2006.01)
*F41H 11/02* (2006.01)
*H04K 3/00* (2006.01)
*G06Q 30/02* (2012.01)

(56) References Cited

U.S. PATENT DOCUMENTS

| | | | | |
|---|---|---|---|---|
| 2014/0371952 | A1* | 12/2014 | Ohtomo | G01C 11/00 |
| | | | | 701/2 |
| 2015/0254214 | A1* | 9/2015 | Rosenberg | G09B 7/08 |
| | | | | 715/202 |
| 2016/0253907 | A1* | 9/2016 | Taveira | G05D 1/106 |
| | | | | 701/3 |
| 2019/0367184 | A1* | 12/2019 | Tremblay | B65D 81/18 |
| 2019/0375503 | A1 | 12/2019 | Maxwell et al. | |
| 2020/0035041 | A1* | 1/2020 | Crist | G06Q 50/30 |

OTHER PUBLICATIONS

"International Application Serial No. PCT/US2019/036619, International Search Report dated Oct. 7, 2019", 4 pgs.
"International Application Serial No. PCT/US2019/036619, Written Opinion dated Oct. 7, 2019", 5 pgs.

* cited by examiner

METHODS AND SYSTEMS FOR REMOTE IDENTIFICATION, MESSAGING, AND TOLLING OF AERIAL VEHICLES

TECHNICAL FIELD

Embodiments described herein generally relate to the monitoring and controlling of air traffic, and more particularly, to the detection, regulation, and tolling of aerial vehicles (e.g., manned or unmanned) to manage air congestion and collect revenue.

RELATED APPLICATIONS

The present application is related to U.S. Provisional Application Ser. No. 62/683,421, filed on Jun. 11, 2018, and U.S. application Ser. No. 16/438,297, filed on Jun. 11, 2019, both of which are incorporated herein by reference in their entireties.

BACKGROUND

Automated aerial vehicles are finding increasing usefulness in civilian applications. For instance, unmanned aerial vehicles (UAVs) are used for a variety of aerial photography and videography tasks, cartography, transportation of goods and people (e.g., air taxis), package delivery, agricultural work such as crop dusting and inspection, traffic monitoring and control, and various law-enforcement and security uses.

With increasing use of automated aerial vehicles comes an increasing need for safety and congestion management. However, different drone manufacturers and models use different broadcast methods, and there is currently no standardization for drone telemetry or identification. That is, many drone platforms could be operating in the same airspace and each could use different telemetry/broadcast/identification methods, which makes drone ID and tolling difficult.

While electronic toll collection and automated vehicle identification exist for current toll roads, most use visual or RFID methods for collecting tolling information. However, these methods are too short range to support collecting tolls from aircraft.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to systems and methods for facilitating airspace tolling. In the present context, airspace tolling refers to regulation of access to airspace with the use of a cost model. The cost model may include a financial cost structure, a non-financial cost structure (e.g., temporal access to the airspace), or both. While described in the context of airspace tolling and using examples of aerial vehicles, it should be appreciated that the methods and apparatus disclosed herein can be extended to maritime tolling and thus should be considered to be within the scope of the disclosure.

More specifically, an embodiment relates to a platform-agnostic aircraft system toll tag that can be used with, for example, manned or unmanned aerial vehicles. For discussion purposes, in the following, an unmanned aircraft system (UAS) is considered as an example. However, the methods and apparatus described herein can be used for tolling of manned aerial vehicles as well. The toll tag is low powered, generic, and can be mounted on any small UAS to transmit platform identification and telemetry data in a configurable, common format via radio frequency or a wireless network (e.g., cellular or WIFI), thereby enabling drone identification and tolling by airspace controllers. Unlike roadway tolling that occurs over a distance measured in terms of feet, this transmission of the platform identification and telemetry data occurs over a distance measured in kilometers. In an embodiment, the toll tag is a bolt-on appliance for commercial and civilian UAS vendors and operators. The toll tag is long range, low weight, low power, and low cost.

According to aspects of the embodiments, airspace tolling may provide a source of revenue as delivery and transport methods utilize airspace. In some aspects, airspace tolling may reduce Class G airspace congestion. Additionally, some aspects facilitate the management of private or corporate airspace use.

Aspects of the embodiments may be implemented as part of a radio-based or wireless network-based detection and communications platform integrated, or interfaced, with a computing platform. The detection, communication, and computing platforms may be implemented as one physical machine, or may be distributed among multiple physical machines, such as by role or function, or by process thread in the case of a cloud-computing or distributed model. In various embodiments, certain operations may be configured to run in virtual machines that in turn are executed on one or more physical machines. It will be understood by persons of skill in the art that features of the present subject matter may be realized by a variety of different suitable machine implementations.

Figure 1:
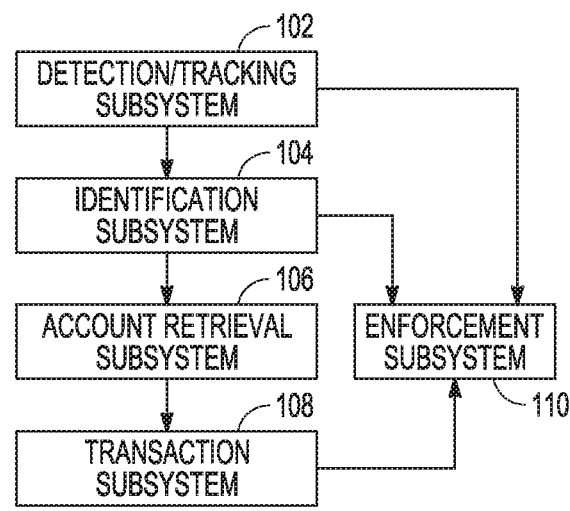
FIG. 1 is a high-level diagram illustrating a system for facilitating airspace tolling according to some examples.

FIG. 1 is a high-level diagram illustrating a system for carrying out airspace tolling operations according to some aspects of the embodiments. Detection and tracking subsystem 102 utilizes detection and ranging technology, such as radio-frequency (RF) based detection, to monitor a volume of airspace for the presence of an aircraft such as an unmanned aircraft system (UAS), an unmanned air vehicle (UAV), and/or an automated aerial vehicle. A variety of suitable detection techniques may be employed, including techniques that have been developed for detection and tracking of aircraft (e.g., scanning Industrial, Scientific, and Medical (ISM) frequency bands for UAV RF activity). In some embodiments, detection and tracking subsystem 102 may further include, for example, sensors including image sensors to supplement aerial vehicle detection. In some, but not necessarily in all embodiments, smaller radars operating with specific frequency bands may be deployed for detection of small UAVs such as delivery drones. For example, in one implementation, a low power X-Band radar may be utilized for detecting aerial vehicles at low altitudes. The toll tag may interact with the detection and identification subsystem by transmitting identification, telemetry, and other data in a common configurable format that may support tolling operations and/or remote UAS identification and messaging. In some embodiments, these data may be transmitted over radio-frequency (RF) or wireless networks (e.g. cellular or WIFI).

Detection of the aircraft in the airspace facilitates and initiates operations to identify the aircraft. To this end, detection of the aircraft may facilitate operation of identification subsystem 104 to receive telemetry signaling from the detected aircraft. For example, tracking of the aircraft by detection and tracking subsystem 102 may provide information on the approximate location, heading, and speed of the aircraft, which may be used to facilitate directional reception of telemetry signaling of the aircraft by identification subsystem 104. Accordingly, identification subsystem 104, on receiving telemetry signaling from the detected estimated location of the aircraft, may associate emitted unique identifying information (e.g., a global unique identifier (GUID)) broadcast by the aircraft, with the detected aircraft.

Account retrieval subsystem 106 includes a database, or an interface to access a database, of aerial vehicle operators and their respective associations with identifiers of specific aerial vehicles. Such a database may be maintained by a third party, such as a governmental agency (e.g., the Federal Aviation Administration (FAA), or a private entity).

In addition, account retrieval subsystem 106 includes a computation engine configured to determine an aerial vehicle operator of the detected and identified aerial vehicle, and to retrieve a transaction account established for that aerial vehicle operator.

In a related embodiment, account retrieval subsystem 106 may determine whether the aerial vehicle or the operator of the aerial vehicle is authorized, or authorizable, to access the airspace. For example, an authorized aerial vehicle may be permitted to enter the airspace and may have an account established in which there is sufficient credit to permit the access. An authorizable aerial vehicle may have an account established by its operator, but the account may lack credits at the current time. Nonetheless, the account may be in good standing and credits may be obtained via a transaction. An unauthorized vehicle is one whose operator is unknown, lacks an account, or is associated with an account that is in bad standing, or which has entered restricted airspace (for which fines or penalties may be levied against the operator), for example.

Transaction subsystem 108 is configured to process financial or non-financial transactions for accounts of aerial vehicle operators. For instance, transaction subsystem 108 may add a charge to the financial account of the aerial vehicle operator of the detected and identified aerial vehicle, in response to the detection and identification by the detection and identification subsystems 102, 104.

As an example of a non-financial transaction, an aerial vehicle operator may be allocated a certain amount of airspace access credits for a given airspace. Accordingly, in response to an instance in which an aerial vehicle belonging to that operator accesses that airspace, the operator's airspace access credits may be debited.

The airspace access may be measurable in terms of duration that an aerial vehicle uses the airspace. In a related example, the airspace access may be subdivided spatially. For example, different altitudes within an airspace may be subject to different costing schedules. Airspace may also be subject to surge charging during periods of known peak activity or high congestion. Accordingly, tiered pricing models may be employed in various toll zones according to some embodiments.

In some embodiments, enforcement subsystem 110 is included. Enforcement subsystem 110 may operate in response to unauthorized access of an airspace, whether by an aerial vehicle of a known operator that lacks access rights (e.g., due to lack of access credits or having an account in bad standing), by a rogue aerial vehicle of unknown provenance, or by a vehicle entering restricted airspace. Enforcement subsystem 110 may notify a law enforcement entity to take appropriate action in response to an unauthorized access of the airspace. In other examples, enforcement subsystem 110 may take actions to disrupt the operation of the unauthorized aerial vehicle (e.g., using RF jamming or overriding of the control signaling being supplied to the unauthorized aerial vehicle). In a related example, enforcement subsystem 110 accesses vehicle-identification information to ascertain the type of aerial vehicle that is the potential subject of enforcement action, and it determines the most appropriate enforcement actions taking into account the vehicle type, payload type, and other factors, so that enforcement may be accomplished safely, thus avoiding harm to people and property.

Figure 2:
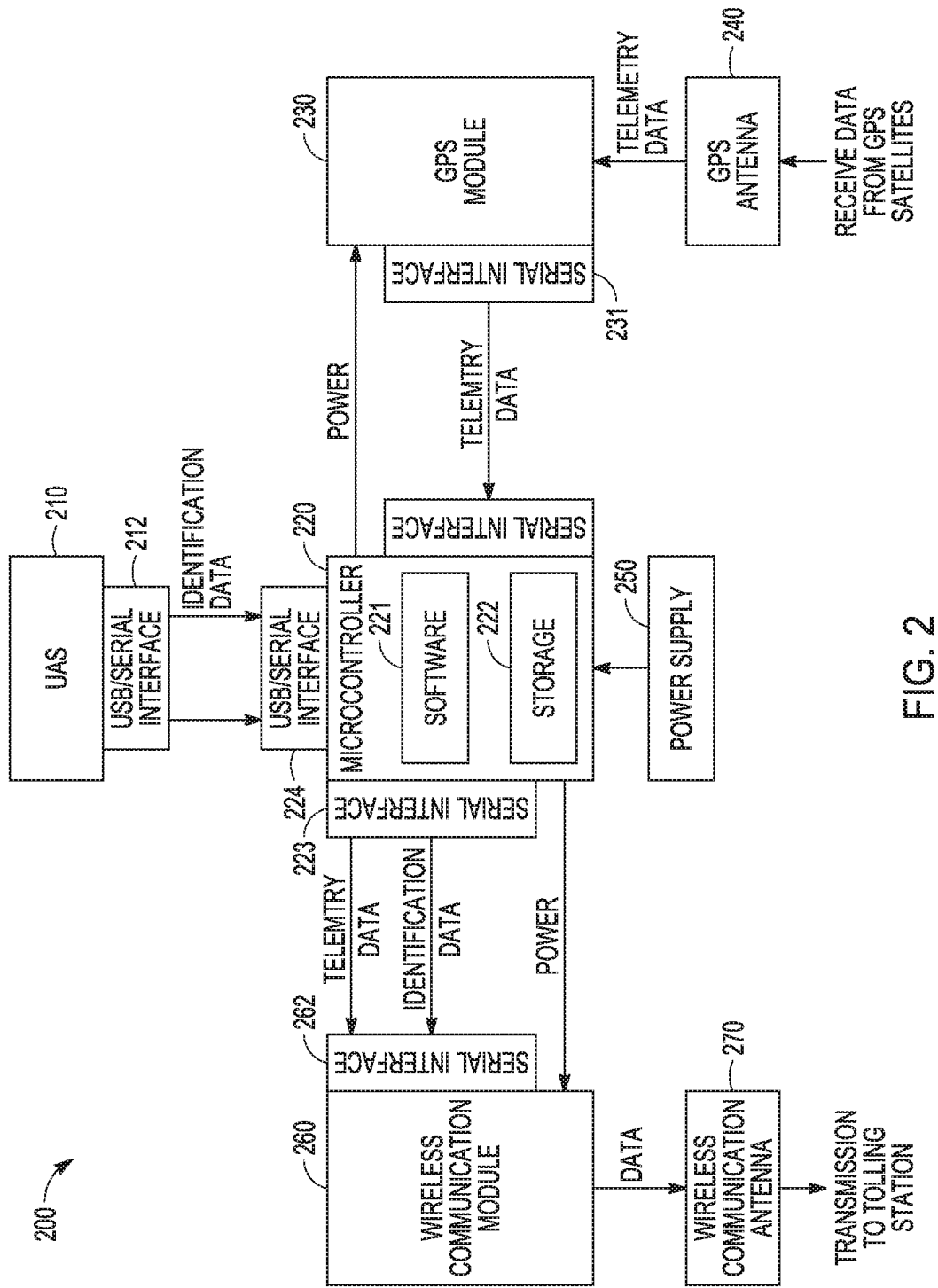
FIG. 2 is a lower-level diagram illustrating a system for facilitating airspace tolling according to some examples.

FIG. 2 is a lower-level diagram illustrating a system 200 for facilitating airspace tolling according to some examples. The system includes an unmanned aircraft system (UAS) 210, and can include a communication interface 212, such as a USB/Serial interface. Through the interface 212, the UAS 210 may transmit identification, telemetry, or other relevant data to a microcontroller 220. The identification data are received at a communication interface such as a USB/Serial interface 224 of the microcontroller 220. The microcontroller 220 further includes a processor for executing software 221, and data storage 222. A power supply 250 provides power to the microcontroller 220. The power supply can be dedicated to the system 200, or the power supply can be part of the UAS 210, whereby the microcontroller uses the same power source that is used to power the UAS itself. The power supply is normally a low-powered, light weight battery.

A global positioning system (GPS) can be associated with the microcontroller 220. Such GPS can include an antenna 240, a GPS module 230, and an associated communication interface, such as a serial interface 231 for transmitting data received from GPS satellites to the microcontroller 220. The GPS module 230 processes the GPS data to determine the location, heading, and velocities of the UAS within a particular monitored airspace. In another embodiment, the microcontroller 220 processes some or all the GPS data.

After processing the UAS and/or GPS data, the microcontroller 220 transmits data via communication interface, such as serial interface 223 to a wireless communication module 260 (via associated serial interface 262), such as a radio transceiver or wireless/cellular network device. The transmitted data may be received at wireless antenna module 270 associated with a tolling station. The wireless communication module 260 may consist of a long-range radio frequency (RF), wireless network, and/or cellular network communication module.

The system 200, and in particular the software running on the microcontroller 220, standardizes drone telemetry for drone identification, tolling, and airspace management purposes. The system 200 takes into account three dimensional, temporal, and non-linear methods for generating the telemetry. The tolling tag can be a bolt-on appliance for government, commercial, and civilian UAS vendors and operators.

The range for detection of the system 200, and in particular the tolling tag, may be up to approximately 10 km over radio frequency (RF). In other embodiments, specifically those using wireless or cellular networks, detection of the system 200 may occur wherever such networks are available. The tolling tag may transmit drone identification, telemetry, drone class, drone size, and drone configuration in a configurable, common format. In some embodiments, aerial vehicles of a first type (e.g., transportation drones) use a first type of common message format while aerial vehicles of a second type (e.g., delivery drones) use a second type of common message format. The different types of formats may be optimized for different types of vehicles given that the packet size, number of bits, etc. may vary for different types of vehicles based on the tolling information being communicated.

In certain embodiments, the tolling systems disclosed herein may use optical transmitters and receivers (at the respective transmitting and receiving devices) for the transmission and reception (respectively) of the tolling data. In such embodiments, the identification, telemetry, class/type, size, and configuration information associated with a given aerial vehicle may be encoded in an optical signal. Such embodiments are well suited in environments and regions where a reasonably clear line of sight is achievable between the aerial vehicles transmitting the tolling data and the receiving tolling station.

Figure 3:
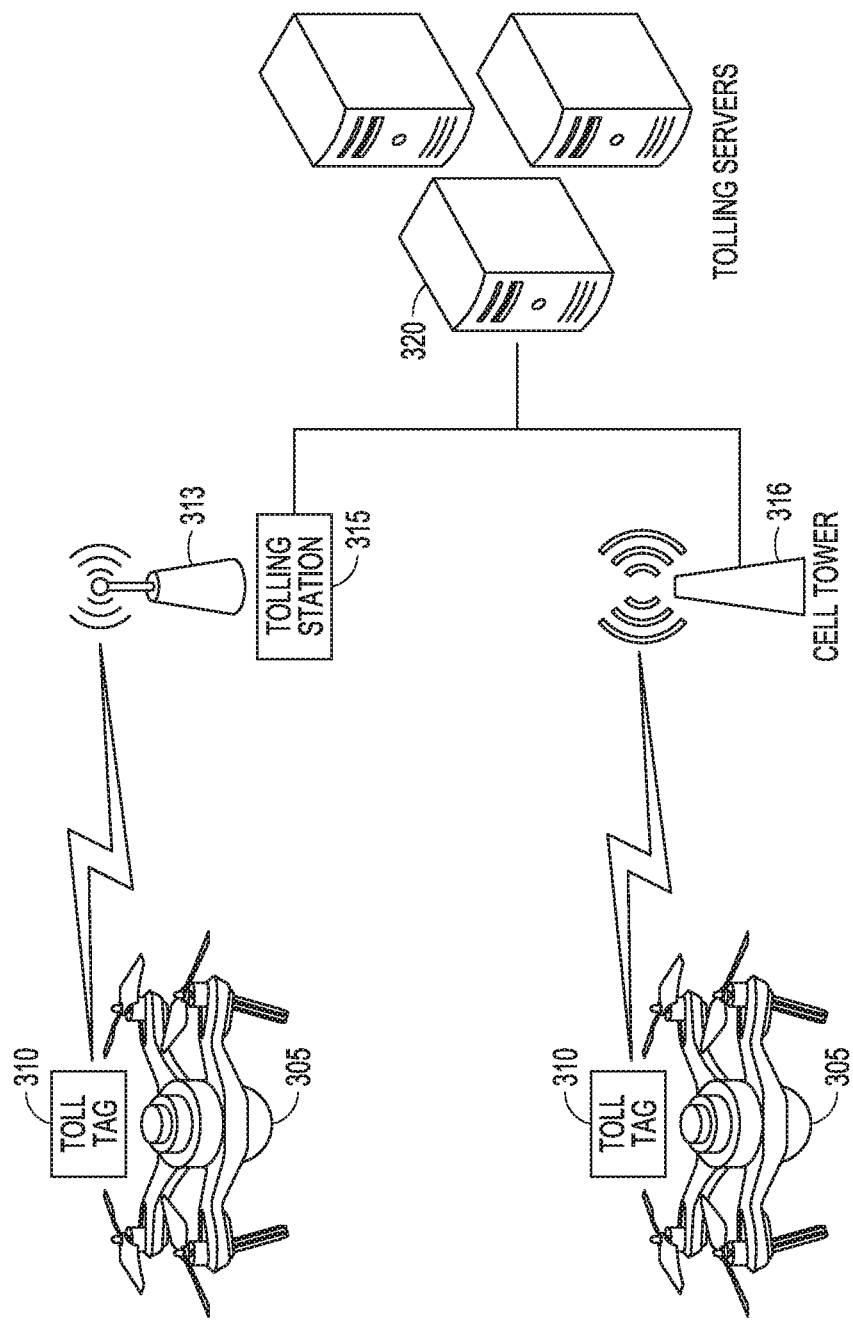
FIG. 3 is another high-level diagram illustrating a system for facilitating airspace tolling according to some examples.

FIG. 3 is another high-level diagram illustrating a system for facilitating airspace tolling according to some examples. FIG. 3 illustrates an unmanned air vehicle (UAV) 305, to which is attached a tolling tag appliance 310. The tolling tag appliance 310 transmits a wireless tolling data signal to receiver 313, which is associated with a tolling station 315. The tolling station 315 transmits tolling data to (a) tolling server(s) 320. Alternatively, the tolling tag appliance may transmit tolling data directly to the tolling server via a wireless or cellular network using cell tower 316.

Figure 4A:
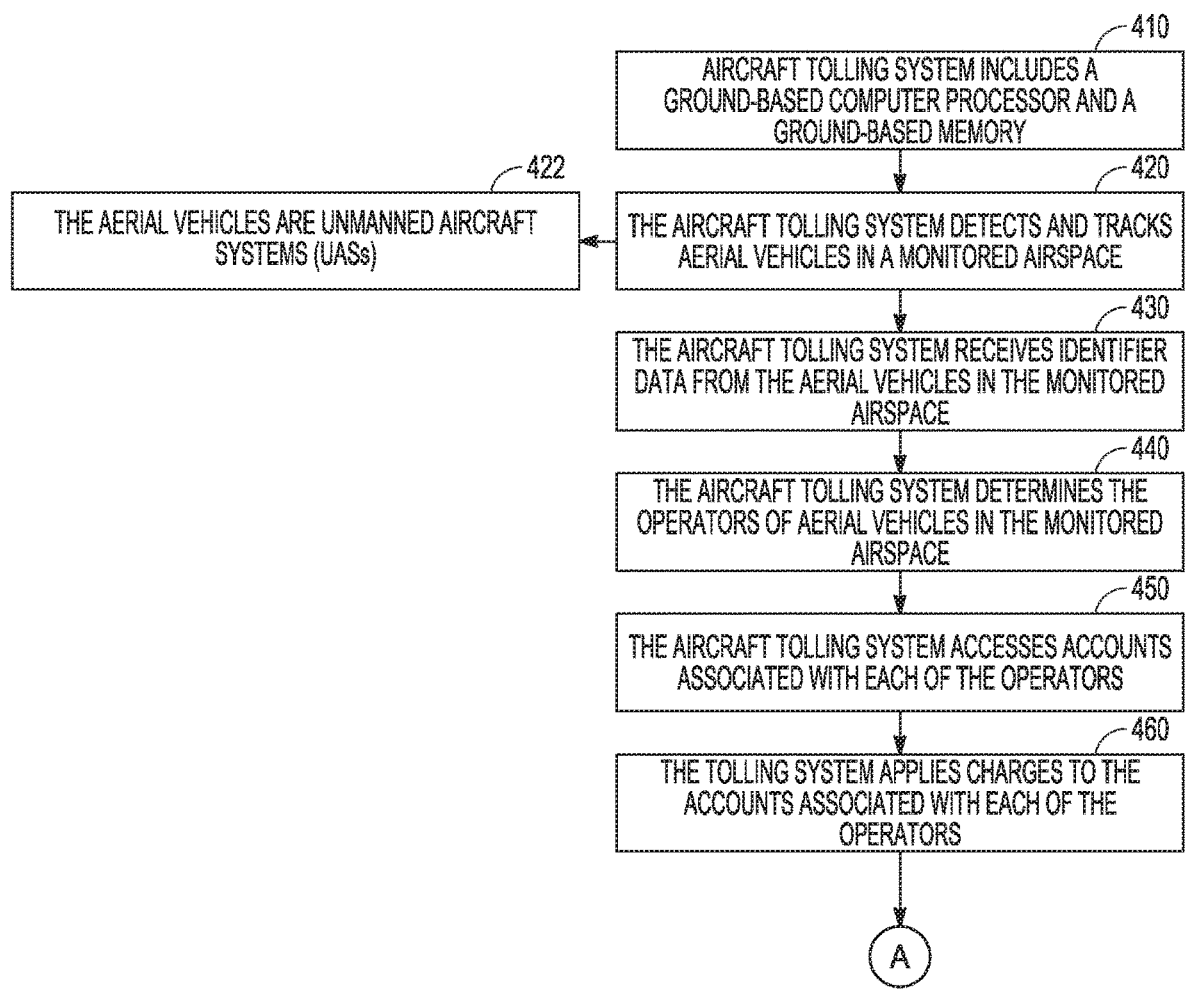
FIGS. 4A, 4B, and 4C are a block diagram of operations and features in a system for facilitating airspace tolling according to some examples.
Figure 4B:
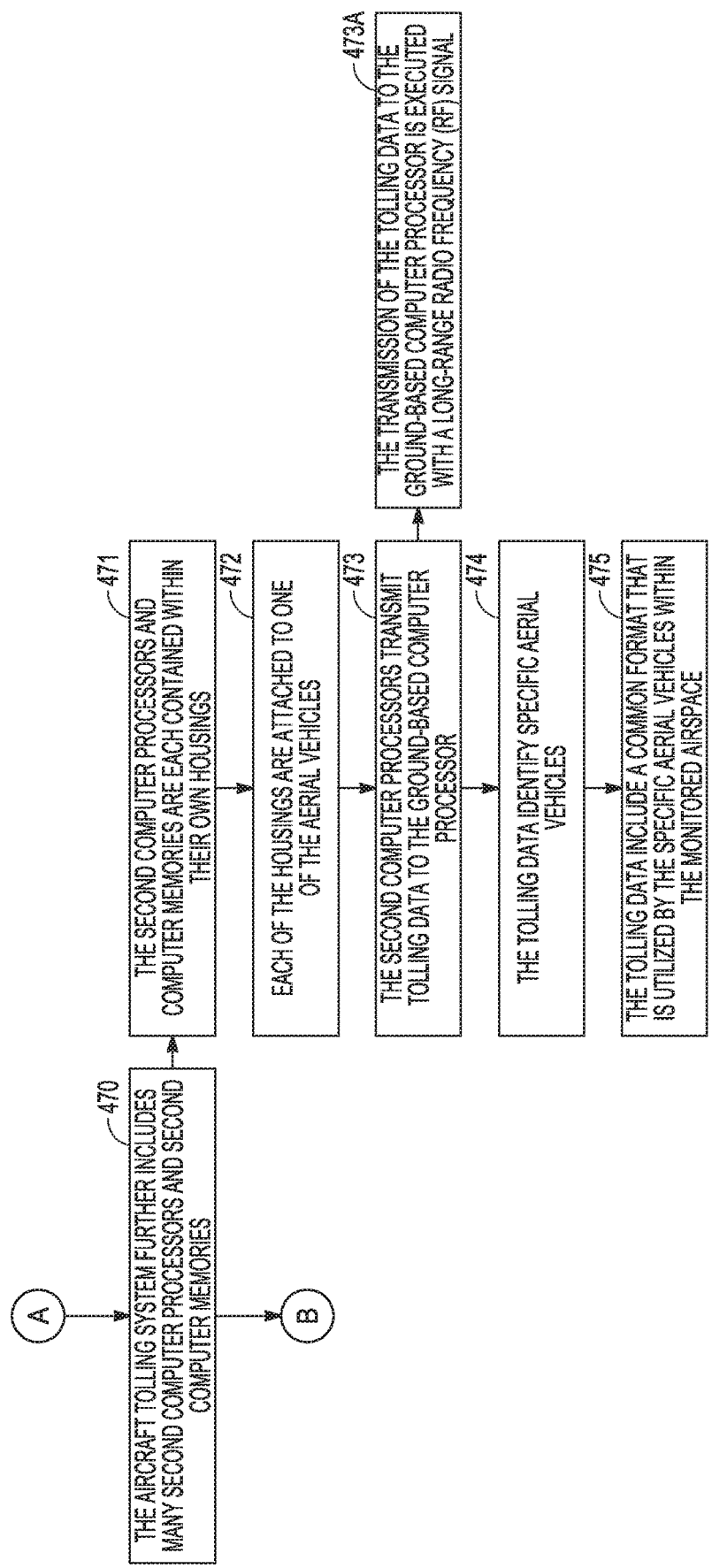
Figure 4C:
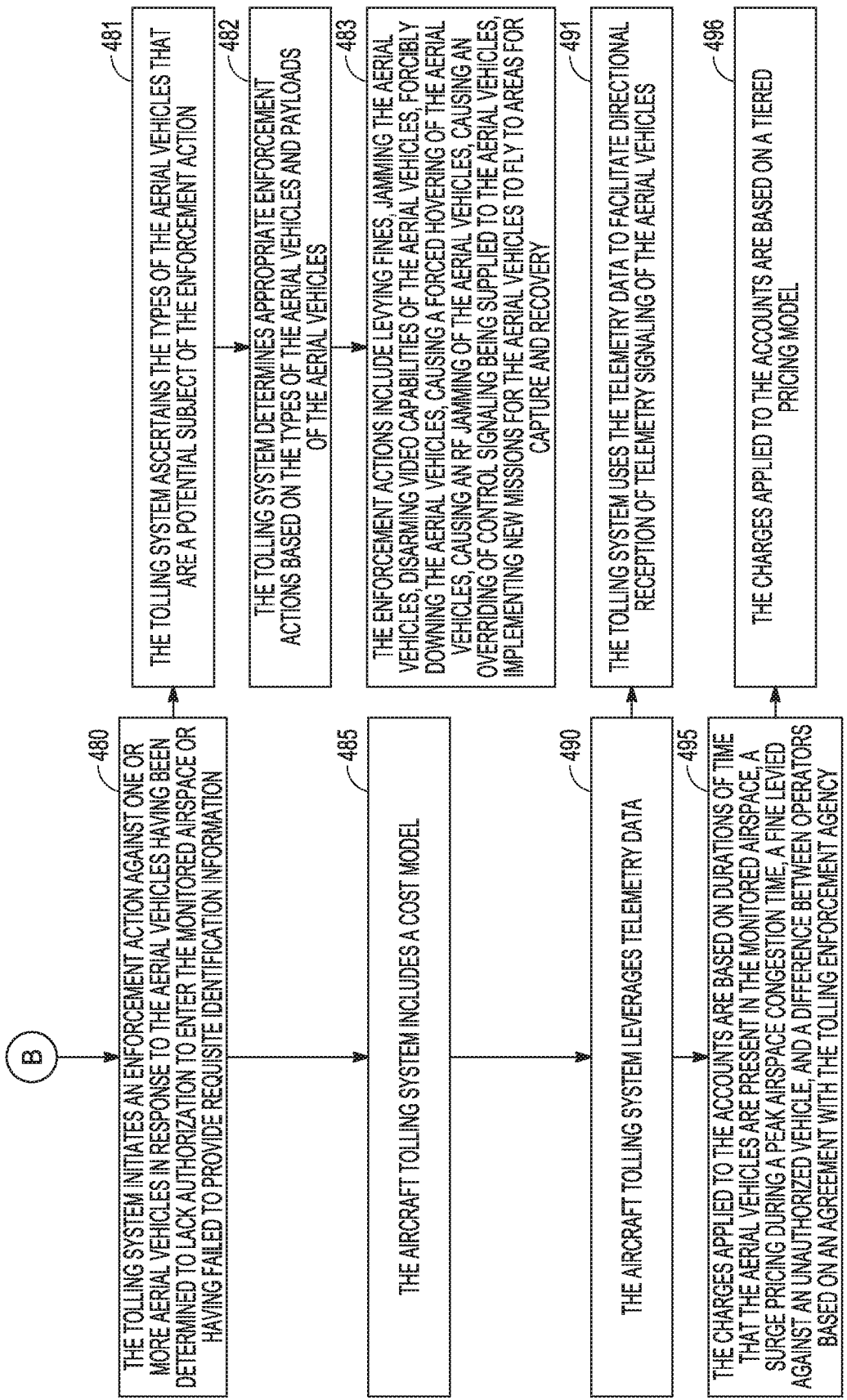

FIGS. 4A, 4B, and 4C are another diagram illustrating a system for carrying out airspace tolling operations according to some aspects of the embodiments. FIGS. 4A, 4B, and 4C include process blocks 410-496. Though arranged substantially serially in the example of FIGS. 4A, 4B, and 4C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 4A, 4B, and 4C, in an embodiment, as indicated at 410, an aircraft tolling system includes a ground-based computer processor and a ground-based memory that is coupled to the ground-based computer processor. At 420, the aircraft tolling system detects and tracks aerial vehicles in a monitored airspace. A toll tag global positioning processor (GPS) determines location, heading, and velocity data for an aerial vehicle in the monitored airspace, which makes it easier to detect and track the aerial vehicle. As indicated at 422, the aerial vehicles can include unmanned aircraft systems (UASs). At 430, the aircraft tolling system receives data from the aerial vehicles in the monitored airspace. These data include unique identifiers for each of the aerial vehicles in the monitored airspace. At 440, the aircraft tolling system determines the operators of aerial vehicles in the monitored airspace based on a database of aerial vehicle and operator associations. At 450, the aircraft tolling system accesses accounts in the database associated with each of the operators, and at 460, the tolling system applies charges to the accounts associated with each of the operators in response to the reception of the unique identifiers of the aerial vehicles in the monitored airspace.

Block 470 discloses that the aircraft tolling system further includes many second computer processors and second computer memories that are coupled to the second computer processors. These second computer processors and computer memories are each contained within their own housings (471). As indicated at 472, each of the housings are attached to one of the aerial vehicles, and as further indicated at 473, the second computer processors transmit tolling data to the ground-based computer processor. The transmission of the tolling data to the ground-based computer processor may be executed with a radio frequency (RF) signal, and in a particular embodiment, a long-range RF signal (473A). Alternatively, the transmission of tolling data may be executed over a wireless network (e.g. cellular or WIFI). These tolling data identify specific aerial vehicles (474). The tolling data further include a common format that is utilized by the specific aerial vehicles within the monitored airspace (475). That is, all the aerial vehicles that are within the monitored airspace use the same common format so that the aircraft tolling system can more easily detect and track all the aerial vehicles in the monitored airspace for tolling and other purposes.

Operations 480-483 describe how the aircraft tolling system implements an enforcement action against aircraft. At 480, the tolling system, and in particular the ground-based computer processor, initiates an enforcement action against one or more of the aerial vehicles in response to the one or more aerial vehicles having been determined to lack authorization to enter the monitored airspace or having failed to provide requisite identification information. At 481, the tolling system ascertains the types of the aerial vehicles that are a potential subject of the enforcement action. At 482, the tolling system determines appropriate enforcement actions based on the types of the aerial vehicles and payloads of the aerial vehicles. As indicated at 483, these enforcement actions can include one or more of levying fines against the operators, destroying or jamming one or more or the aerial vehicles, disarming video capabilities of one or more of the aerial vehicles, forcibly downing one or more of the aerial vehicles, causing a forced hovering of one or more of the aerial vehicles in one or more columns of the monitored airspace, causing a radio frequency (RF) jamming of one or more of the aerial vehicles, causing an overriding of control signaling being supplied to one or more of the aerial vehicles, and implementing new missions for one or more of the aerial vehicles to fly to one or more areas for capture and recovery.

As indicated at 485, the aircraft tolling system can include a cost model. The cost model can include a financial cost structure and/or a non-financial cost structure. The non-financial cost structure can include temporal access restrictions to the monitored airspace such that the operators are allocated amounts of airspace access credits for given airspaces. Then, the aircraft tolling system debits the airspace access credits of the operators when the aerial vehicles associated with the operators access the given airspaces.

As indicated at 490, the aircraft tolling system, and in particular the ground-based computer processor, leverages telemetry data. The telemetry data include locations, headings, and/or speeds of the aerial vehicles. At 491, the tolling system uses the data on the locations, the headings, and the speeds of the aerial vehicles to facilitate directional reception of telemetry signaling of the aerial vehicles.

As indicated at 495, the charges applied to the accounts associated with each of the operators are based on one or more of durations of time that the aerial vehicles are present in the monitored airspace, a surge pricing during a peak airspace congestion time, a fine levied against an unauthorized vehicle, and a difference between operators based on an agreement with the tolling enforcement agency. At 496, the charges applied to the accounts associated with each of the operators are based on a tiered pricing model such that different altitudes and different geographic regions within the monitored airspace are subject to different costing schedules.

In some embodiments, one or more enforcement actions may be temporarily applied, e.g., in a reversible manner, until a confirmation can be made regarding the aerial vehicle. For example, rather than immediate destruction or jamming of the aerial vehicle upon detection of lack of authorization to enter into the monitored airspace (or failure to provide authentication credentials), the enforcement subsystem may temporarily disarm the video capability or restrict/confine the movement of the aerial vehicle, and may attempt subsequent authentication attempts. If a subsequent attempt for authentication is successful, the disabled video capability of the aerial vehicle may be re-enabled.

In some embodiments, tolls may be generated based on tag identifiers making a distinction between commercial vehicles, recreational vehicles, municipal/service use vehicles, size, weight, number of motors, noise, and speed. Various features of the embodiments described herein provide an ability to tie in telemetry and carrier characteristics that allows tolling based on altitude of the vehicle or a use case (e.g., different classes of air space), etc. For example, lower altitudes may be more desirable for delivery applications because of the need to repeatedly return to the earth's surface for the delivery of packages. As another example, an aerial vehicle flying at 10,000 feet may pay $1, where those flying at 5,000 feet may pay $2. This essentially carves up the air space into sectors that can be differentiated due to the telemetry being sent from the drone. The 10,000 foot range listed is for detection and the directions are dependent on the antenna selected for the implementation. Some could be omni-directional and provide full coverage, while others may want directional coverage. This could also be scaled up if areas have higher congestion.

In some implementations, the tolling mechanism described herein is non-linear "cell"/grid based and geofenced based. In general, airspace is a much larger space (e.g., relative to ground space/areas subject to tolling) and objects can pass through at many angles. Depending on how tolling stations are setup, certain zones can be skipped. For example, in one scenario one aerial vehicle could go from zone 1 to zone 2 to zone 3, whereas a different aerial vehicle may just go from zone 1 to zone 3.

The tolling method and system described herein can allow for objects that are static and that are not passing through an airspace to be tolled. For example, a UAS just moving vertically without significant X/Y axis movement to cross into other stations detection radius. Any flights in the toll zone, even if they are not actively moving through the toll zone, can still be charged a toll.

Some features of the tolling system allow tolling based on a duration of time a vehicle stays in the monitored airspace. This ensures those that stay in the toll zone longer will pay for the total time. This is not the case with other types of tolling, e.g., ground vehicle tolling examples, which do not take into account the time duration. This could also be scaled up if areas have higher congestion.

Detection of untagged items may provide good metrics for coverage and whether additional or reduced number of stations are desirable. The metrics could also be good for determining pricing models for tolls/rates for their use cases. Metrics can also be used to validate/verify information; for example, 30 deliveries listed at depot, but tolling only showed 25.

Compared to tolling systems for cars, the detection range for use in airspace tolling systems described herein is much larger. For example, in some embodiments, using RF for communication, the expected range is up to 10 km. The range may also extend in all directions. In other embodiments, utilizing cellular or other wireless networks for communication, tolling data may be transmitted wherever such networks are available.

Figure 5:
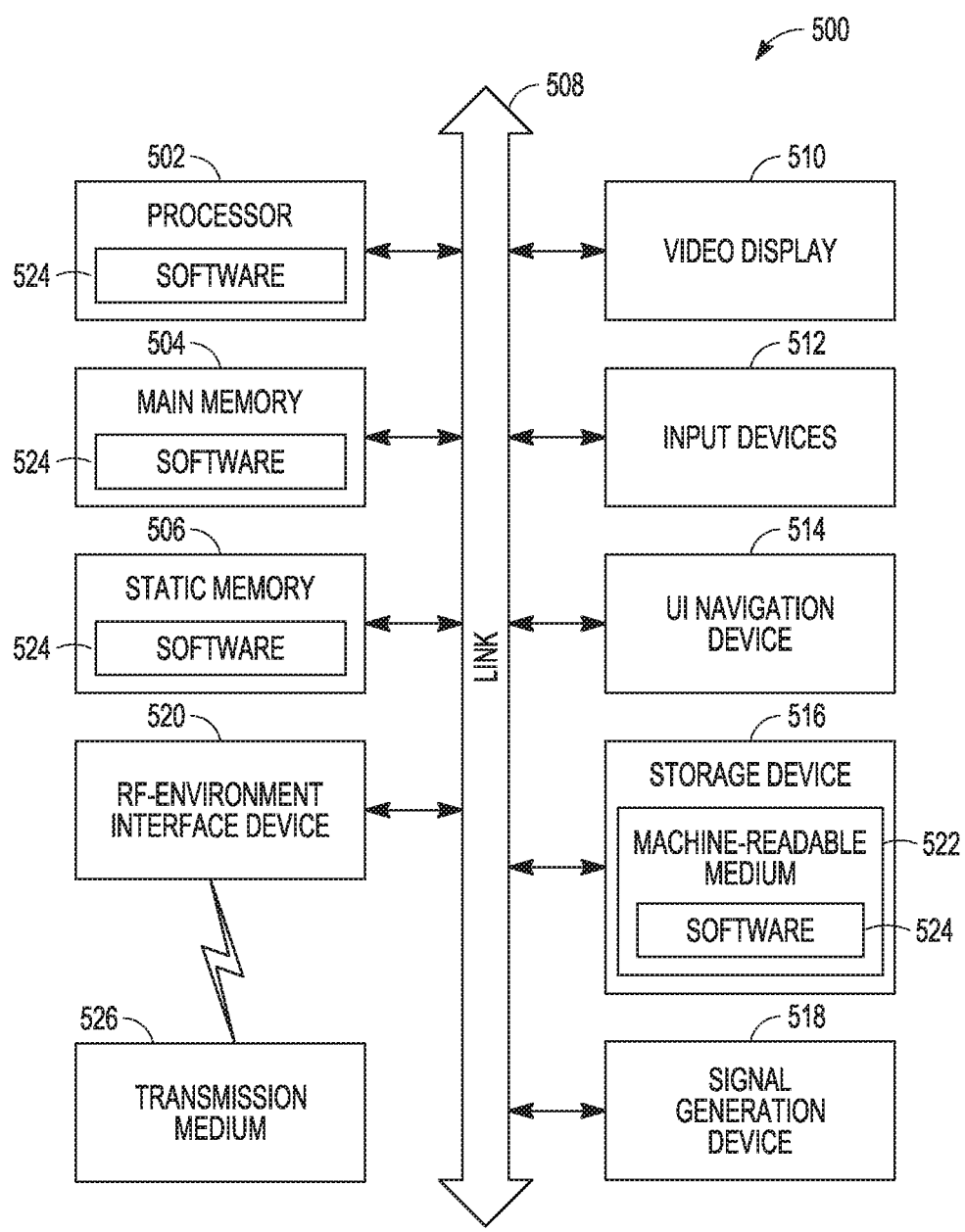
FIG. 5 is a block diagram of a computer architecture upon which one or more embodiments can execute.

FIG. 5 is a block diagram illustrating a computing and communications platform 500 in the example form of a general-purpose machine on which some or all of the system of FIG. 1 may be carried out according to various embodiments. In certain embodiments, programming of the computing platform 500 according to one or more particular algorithms produces a special-purpose machine upon execution of that programming. In a networked deployment, the computing platform 500 may operate in the capacity of either a server or a client machine in server-client network environments, or it may act as a peer machine in peer-to-peer (or distributed) network environments. Computing platform 500, or some portions thereof, may represent an example architecture of computing platform or external computing platform according to one type of embodiment.

Example computing platform 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computing platform 500 may further include a video display unit 510, input devices 512 (e.g., a keyboard, camera, microphone), and a user interface (UI) navigation device 514 (e.g., mouse, touchscreen). The computing platform 500 may additionally include a storage device 516 (e.g., a drive unit), a signal generation device 518 (e.g., a speaker), and a RF-environment interface device (RFEID) 520.

The storage device 516 includes a non-transitory machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computing platform 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 520 includes radio receiver circuitry, along with analog-to-digital conversion circuitry, and interface circuitry to communicate via link 508 according to various embodiments. Various form factors are contemplated for RFEID 520. For instance, RFEID may be in the form of a wideband radio receiver, or scanning radio receiver, that interfaces with processor 502 via link 508. In one example, link 508 includes a PCI Express (PCIe) bus, including a slot into which the NIC form-factor may removably engage. In another embodiment, RFEID 520 includes circuitry laid out on a motherboard together with local link circuitry, processor interface circuitry, other input/output circuitry, memory circuitry, storage device and peripheral controller circuitry, and the like. In another embodiment, RFEID 520 is a peripheral that interfaces with link 508 via a peripheral input/output port such as a universal serial bus (USB) port. RFEID 520 receives RF emissions over wireless transmission medium 526. RFEID 520 may be constructed to receive RADAR signaling, radio communications signaling, unintentional emissions, or some combination of such emissions.

Examples, as described herein, may include, or may operate on, logic or a number of components, circuits, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:
1. An aircraft tolling system comprising:
a first ground-based computer processor;

a first computer memory coupled to the first ground-based computer processor;
at least one second computer processor;
at least one second computer memory coupled to the at least one second computer processor; and
at least one housing containing the at least one second computer processor and the at least one second computer memory;
wherein the at least one housing is configured for attachment to at least one aerial vehicle;
wherein the at least one second computer processor is operable to transmit tolling data to the first ground-based computer processor;
wherein the tolling data identify the at least one aerial vehicle;
wherein the tolling data comprise a common format that is utilized by the at least one aerial vehicle within a monitored airspace; and
wherein the first ground-based computer processor is operable for:
 detecting and tracking the at least one aerial vehicle in the monitored airspace;
 receiving the tolling data from the at least one aerial vehicle in the monitored airspace, the tolling data comprising unique identifiers for the at least one aerial vehicle in the monitored airspace;
 determining operators for the at least one aerial vehicle in the monitored airspace based on a database of aerial vehicle and operator associations;
 accessing accounts in the database associated with each of the operators; and
 applying charges to the accounts associated with each of the operators in response to the reception of the unique identifiers of the at least one aerial vehicle in the monitored airspace.

2. The aircraft tolling system of claim 1, wherein the at least one aerial vehicle comprises an unmanned aircraft system (UAS).

3. The aircraft tolling system of claim 1, wherein the transmission of the tolling data to the first ground-based computer processor comprises use of a wireless network or a radio frequency (RF) signal.

4. The aircraft tolling system of claim 3, wherein the RF signal comprises a long-range RF signal.

5. The aircraft tolling system of claim 1, wherein the at least one second computer processor comprises a global positioning system (GPS) processor; and wherein the GPS processor determines location, heading, and velocity data for the at least one aerial vehicle.

6. The aircraft tolling system of claim 1, wherein the first ground-based computer processor is operable for:
 initiating an enforcement action against the at least one aerial vehicle in response to the at least one aerial vehicle having been determined to lack authorization to enter the monitored airspace or having failed to provide requisite identification information;
 ascertaining a type of the at least one aerial vehicle that is a potential subject of the enforcement action;
 determining appropriate enforcement actions based on the type of the at least one aerial vehicle and payload of the at least one aerial vehicle; and
 executing one or more of levying fines against the operators, destroying or jamming the at least one aerial vehicle, disarming video capabilities of the at least one aerial vehicle, forcibly downing the at least one aerial vehicle, causing a forced hovering of the at least one aerial vehicle in a column of the monitored airspace, causing a radio frequency (RF) jamming of the at least one aerial vehicle, causing an overriding of control signaling being supplied to the at least one aerial vehicle, and implementing new missions for the at least one aerial vehicle to fly to an area for capture and recovery.

7. The aircraft tolling system of claim 1, comprising a cost model, wherein the cost model comprises one or more of a financial cost structure and a non-financial cost structure; wherein the non-financial cost structure comprises temporal access restrictions to the monitored airspace such that the operators are allocated amounts of airspace access credits for given airspaces; and wherein the aircraft tolling system debits the airspace access credits of the operators when the aerial vehicles associated with the operators access the given airspaces, thereby controlling an amount of time that the aerial vehicles are allowed to access the given airspaces.

8. The aircraft tolling system of claim 1, wherein the first ground-based computer processor is operable for leveraging telemetry data comprising one or more of locations, headings, and speeds of the at least one aerial vehicle; and using the data on the locations, the headings, and the speeds of the at least one aerial vehicle to facilitate directional reception of telemetry signaling of the at least one aerial vehicle.

9. The aircraft tolling system of claim 1, wherein charges applied to accounts associated with operators of the aircraft tolling system are based on one or more of durations of time that the at least one aerial vehicle are present in the monitored airspace, a surge pricing during a peak airspace congestion time, a fine levied against an unauthorized vehicle, and a difference between operators based on an agreement with the tolling enforcement agency.

10. The aircraft tolling system of claim 1, wherein charges applied to accounts associated with operators of the aircraft tolling system are based on a tiered pricing model such that different altitudes and different geographic regions within the monitored airspace are subject to different costing schedules.

11. An aircraft tolling device comprising:
 a first computer processor;
 a first computer memory coupled to the first computer processor; and
 a housing containing the first computer processor and the first computer memory;
 wherein the housing is configured for attachment to an aerial vehicle;
 wherein the first computer processor is operable to transmit tolling data to a second ground-based computer processor;
 wherein the tolling data identify the aerial vehicle; and
 wherein the tolling data comprise a common format that is utilized by the aerial vehicle and other aerial vehicles within the monitored airspace; and
 wherein the second ground-based computer processor is operable for:
  detecting and tracking the aerial vehicle in the monitored airspace;
  receiving the tolling data from the aerial vehicle in the monitored airspace, the tolling data comprising unique identifiers for the aerial vehicle in the monitored airspace;
  determining operators for the aerial vehicle in the monitored airspace based on a database of aerial vehicle and operator associations;
  accessing accounts in the database associated with each of the operators; and applying charges to the accounts associated with each of the operators in response to the reception of the unique identifiers of the aerial vehicle in the monitored airspace.

12. The aircraft tolling device of claim 11, wherein the transmission of the tolling data to the second ground-based computer processor comprises use of a wireless network or a long-range radio frequency (RF) signal.

13. The aircraft tolling device of claim 11, wherein the second ground-based computer processor is operable for:
   initiating an enforcement action against the at least one aerial vehicle in response to the at least one aerial vehicle having been determined to lack authorization to enter the monitored airspace or having failed to provide requisite identification information;
   ascertaining a type of the at least one aerial vehicle that is a potential subject of the enforcement action;
   determining appropriate enforcement actions based on the type of the at least one aerial vehicle and payload of the at least one aerial vehicle; and
   executing one or more of levying fines against the operators, destroying or jamming the at least one aerial vehicle, disarming video capabilities of the at least one aerial vehicle, forcibly downing the at least one aerial vehicle, causing a forced hovering of the at least one aerial vehicle in a column of the monitored airspace, causing a radio frequency (RF) jamming of the at least one aerial vehicle, causing an overriding of control signaling being supplied to the at least one aerial vehicle, and implementing new missions for the at least one aerial vehicle to fly to an area for capture and recovery.

14. The aircraft tolling device of claim 11, wherein the second ground-based computer processor comprises a cost model, wherein the cost model comprises one or more of a financial cost structure and a non-financial cost structure; wherein the non-financial cost structure comprises temporal access restrictions to the monitored airspace such that the operators are allocated amounts of airspace access credits for given airspaces; and wherein the aircraft tolling system debits the airspace access credits of the operators when the aerial vehicles associated with the operators access the given airspaces.

15. The aircraft tolling device of claim 11, wherein the second ground-based computer processor is operable for leveraging telemetry data comprising one or more of locations, headings, and speeds of the at least one aerial vehicle; and using the data on the locations, the headings, and the speeds of the at least one aerial vehicle to facilitate directional reception of telemetry signaling of the at least one aerial vehicle.

16. The aircraft tolling device of claim 11, wherein the charges applied to the accounts associated with each of the operators are based on one or more of durations of time that the at least one aerial vehicle are present in the monitored airspace, a surge pricing during a peak airspace congestion time, a fine levied against an unauthorized vehicle, and a difference between operators based on an agreement with the tolling enforcement agency.

17. The aircraft tolling device of claim 11, wherein the charges applied to the accounts associated with each of the operators are based on a tiered pricing model such that different altitudes and different geographic regions within the monitored airspace are subject to different costing schedules.

18. A process for monitoring at least one aerial vehicle in a monitored air space comprising:
   transmitting data from the at least one aerial vehicle to a computer processor; and
   receiving the data at the computer processor;
   wherein the at least one aerial vehicle comprises an aerial vehicle computer processor;
   wherein the aerial vehicle computer processor is contained in a housing;
   wherein the housing is configured for attachment to the at least one aerial vehicle;
   wherein the data comprise one or more of identification data, messaging data, and tolling data;
   wherein the data comprise a common format that is utilized by the at least one aerial vehicle in the monitored airspace;
   wherein the computer processor is positioned at a location other than the at least one aerial vehicle; and
   wherein the computer processor is operable for:
      detecting and tracking the at least one aerial vehicle in the monitored airspace;
      receiving the tolling data from the at least one aerial vehicle in the monitored airspace, the tolling data comprising unique identifiers for the at least one aerial vehicle in the monitored airspace;
      determining operators for the at least one aerial vehicle in the monitored airspace based on a database of aerial vehicle and operator associations;
      accessing accounts in the database associated with each of the operators; and
      applying charges to the accounts associated with each of the operators in response to the reception of the unique identifiers of the at least one aerial vehicle in the monitored airspace.

* * * * *